United States Patent [19]

Brolund et al.

[11] 4,063,059
[45] Dec. 13, 1977

[54] PUNCH PRESS WITH CUTTING TORCH

[75] Inventors: Theodore F. Brolund; Burton A. Rolland; Merle R. Pauley, all of Rockford, Ill.

[73] Assignee: W. A. Whitney Corporation, Rockford, Ill.

[21] Appl. No.: 735,087

[22] Filed: Oct. 22, 1976

[51] Int. Cl.² .............................................. B23K 9/00
[52] U.S. Cl. .................... 219/68; 219/121 P; 219/158; 266/48; 266/65
[58] Field of Search ........ 219/121 P, 121 R, 121 LM, 219/68, 63, 73, 158, ; 266/48, 49, 146, 147, 65, 274; 228/149; 83/165

[56] References Cited

U.S. PATENT DOCUMENTS

| 499,519 | 6/1893 | Coffin | 219/68 |
|---|---|---|---|
| 2,030,050 | 2/1936 | Coberly | 266/49 |
| 2,768,278 | 10/1956 | Gaines | 219/74 |
| 3,666,249 | 5/1972 | MacLeod, Jr. | 266/65 |
| 3,743,260 | 7/1973 | Alleman et al. | 266/65 |
| 3,944,203 | 3/1976 | Brekelbaum | 266/65 |

*Primary Examiner*—Bruce A. Reynolds
*Assistant Examiner*—Mark H. Paschall
*Attorney, Agent, or Firm*—Leydig, Voit, Osann, Mayer & Holt, Ltd.

[57] ABSTRACT

Small and regularly shaped holes are formed in a workpiece by the punch of a punch press while large and irregularly shaped holes are formed by a plasma-arc torch attached to the punch press. Fumes and molten metal resulting from operation of the torch are directed into an upright duct which underlies the workpiece, the upper end of the duct engaging the workpiece to prevent deformation thereof. When the punch is operating, the upper end of the duct is retracted downwardly to provide clearance for movable clamps which grip and position the workpiece.

Additional fumes are collected in and sucked from a shroud which encloses the tip of the torch and which carries a collar for establishing the stand-off height of the torch.

11 Claims, 6 Drawing Figures

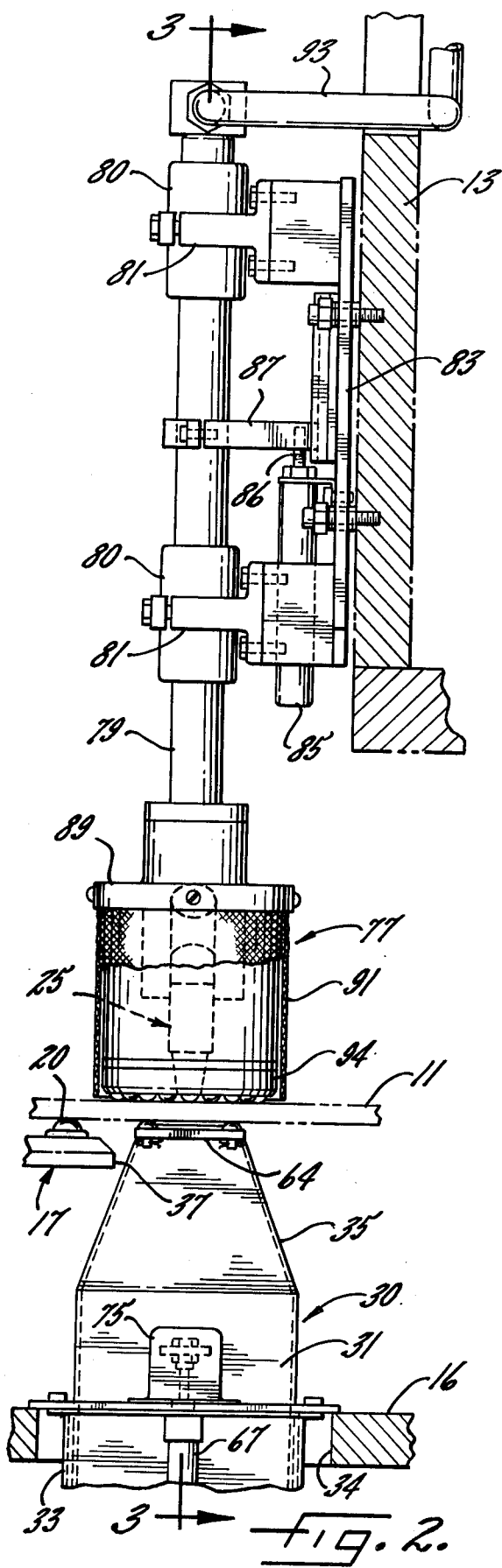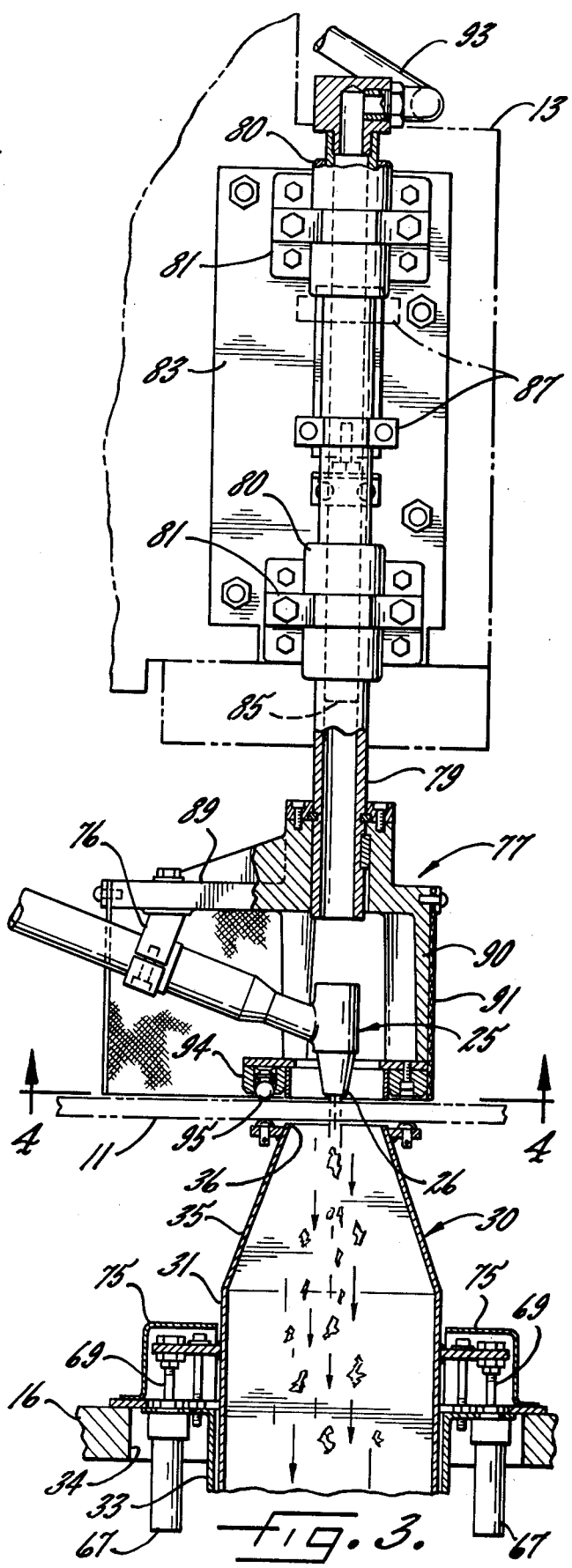

PUNCH PRESS WITH CUTTING TORCH

BACKGROUND OF THE INVENTION

This invention relates to apparatus for cutting metal workpieces by melting the workpieces with a melting tool such as a plasma-arc torch. The invention more particularly relates to apparatus in which a melting tool such as a plasma-arc torch acts in conjunction with a punch press for forming holes in the workpiece. The combination of a punch press and a plasma-arc torch is disclosed in Swanson United States application Ser. No. 688,966, filed May 24, 1976 and assigned to the assignee of the present invention.

As disclosed in the Swanson application, the punch press includes a reciprocating punch which coacts with a die to form comparatively small and substantially regularly shaped holes in the workpiece. The latter is supported on a table which is adapted to be moved in a fore-and-aft direction relative to the punch. Carried on the table and movable relative thereto in a transverse direction is a clamp which is adapted to grip one edge of the workpiece. By shifting the table in a fore-and-aft direction and by shifting the clamp in the transverse direction, various areas of the workpiece may be positioned beneath the punch to enable holes to be punched at selected locations in the workpiece.

The movable table and the movable clamp also are used to position the workpiece beneath the plasma-arc torch, the latter being used to cut sections from the workpiece and to form large and irregularly shaped holes in the workpiece. The torch operates by ionizing a column of gas with an electric arc to produce temperatures up to 30,000° F. A high velocity, high temperature plasma stream and electric arc strike the workpiece with the heat serving to instantly melt the metal while the high velocity stream blows away the molten metal.

In the apparatus disclosed in the Swanson application, a duct extends upwardly through the work table and is disposed beneath the workpiece in alinement with the torch. Molten metal falls downwardly into the duct for collection and periodic removal while fumes are sucked into the duct and away from the work area by a vacuum system. Prior to the fumes being discharged from the vacuum system, foreign particles are filtered from the fumes in order to provide a relatively clean discharge to atmosphere.

SUMMARY OF THE INVENTION

One object of the present invention is to provide apparatus of the type having a new improved exhaust duct which is capable of engaging and supporting the underside of the workpiece in the vicinity of the torch in order to prevent deformation of the overlying area of the workpiece as the metal is melted by the torch.

Another object is to provide convexly shaped projections on the upper end of the exhaust duct, the projections supporting the workpiece while enabling the workpiece to move freely across the duct.

An important object of the invention is to provide an exhaust duct which supports the workpiece when the torch is operating but which may be retracted downwardly away from the workpiece when the torch is idle and a punching operation is being performed. Being retractible, the duct does not interfere with the workpiece clamp during punching and enables the clamp to be moved to a position above the duct.

The invention also resides in automatically retracting the duct downwardly when the torch is retracted upwardly to an inactive position and in automatically extending the duct upwardly when the torch is lowered to an active position.

Still another object is to at least partially enclose the torch with a fume-collecting shroud and to suck fumes from the shroud with the same vacuum system which is used to remove fumes from the exhaust duct, the shroud also serving to dampen the noise of the torch and to shield the operator from the arc.

These and other objects and advantages of the invention will become more apparent from the following detailed description when taken in conjunction with the accompanying drawings.

BRIEF DESCRIPTION OF THE DRAWINGS

FIG. 2 is an enlarged fragmentary cross-section taken substantially along the line 2—2 of FIG. 1.

FIG. 3 is a fragmentary cross-section taken substantially along the line 3—3 of FIG. 2.

DETAILED DESCRIPTION OF THE PREFERRED EMBODIMENT

Figure 1:
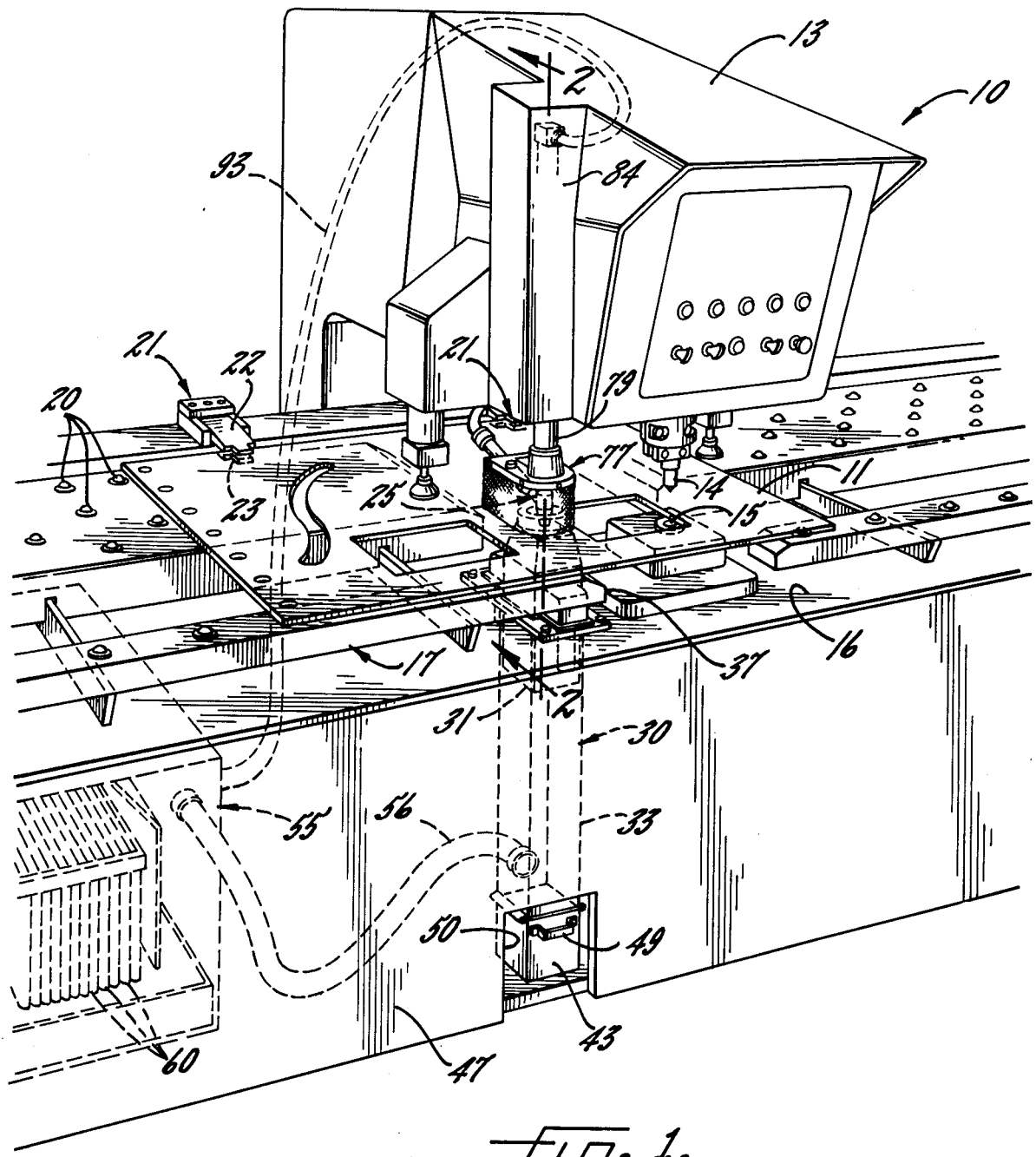
FIG. 1 is a fragmentary perspective view of an exemplary punch press having a plasma-arc torch and incorporating the new and improved features of the present invention.

The present invention is illustrated in the drawings in conjunction with a punch press 10 which may be used for forming holes in a workpiece 11 which herein is shown as a flat piece of sheet metal. The press includes a conventional C-shaped support or frame 13 housing a hydraulic actuator (not shown) which is adapted to reciprocate a punch 14. A die 15 underlies the workpiece and is disposed in vertical alinement with the punch to coact with the latter and form a hole in the workpiece when the punch is shifted downwardly.

Underlying and supporting the workpiece 11 and mounted on a stationary bed 16 is a table 17 which is adapted to be driven in a fore-and-aft direction on the bed in order to shift the workpiece back and forth beneath the punch 14. The table supports anti-friction balls 20 which allow the workpiece to move in the transverse direction (i.e., left to right or vice versa) across the table and beneath the punch. To effect such movement, two clamps 21 are carried on the back of the table, grip the rear margin of the workpiece and are adapted to be driven transversely along the table to shift the workpiece. Each clamp includes upper and lower horizontally extending jaws 22 and 23 which respectively engage the upper and lower sides of the workpiece.

As described thus far, the punch press 10 is similar to that manufactured and sold by W. A. Whitney Corp. under Model 647B-NC, Panelmaster. In such a press, movement of the punch 14, the table 17 and the clamps 21 is numerically controlled so that the workpiece 11 may be automatically shifted to different locations beneath the punch to enable holes to be punched in various predetermined areas of the workpiece. To increase the versatility and productivity of the press 10, a metal melting tool which herein is in the form of a plasma-arc torch 25 (FIGS. 1 and 3) is attached to one side of the C-frame 13 and is adapted to cut large and irregularly contoured shapes out of the workpiece.

Plasma-arc torches such as the torch 25 are commercially available as, for example, from Thermal Dynamics Corporation of West Lebanon, N.H. Basically, such a torch includes a tip 26 defining a small orifice through which an ionized column of gas and an electric arc are forced. The plasma stream and the electric arc (hereinafter called the plasma-arc) are discharged from the orifice at high velocity and produce extremely high temperature to cause instantaneous melting of the underlying portion of the workpiece 11 and to blast the molten metal downwardly from the workpiece. This process makes a clean, high speed cut with little slag formation and is generally accepted as the preferred method of cutting sections up to 6" thick from stainless steel and non-ferrous or clad metals that are not easily cut by oxygen fuel gas processes.

With the plasma-arc torch 25 mounted on the press frame 13, the punch 14 can be used to form small and regularly shaped holes in the workpiece 11 while the torch can be used in place of a nibbling operation to rapidly cut larger holes and to form irregularly shaped openings. Also, the punch may be used to form a starting hole in the workpiece section or sections to be cut by the torch and thereby eliminate direct downward impingement of the plasma-arc on solid metal. This reduces the danger of the tip 26 becoming plugged by metal which otherwise might splatter upwardly upon initial contact of the plasma-arc with the workpiece 11. Because both the punch 14 and the torch 25 are served by a common workpiece positioning system (namely, the table 17, the clamps 21, and the numerical control), both punching and cutting of the workpiece can be effected with a single program and without need of transferring the workpiece from station-to-station between the punching and cutting operations.

During operation of the torch 25, hot fumes and molten metal are produced. The molten metal is collected beneath the bed 16 of the press 10 while the fumes are disposed of by means of a dry exhaust system.

More specifically, the molten metal and the fumes resulting from the cutting operation are directed into an upright duct 30 (see FIGS. 2 and 5) which extends upwardly through the table 17 and which is located in vertical alinement with the tip 26 of the torch 25. Herein, the duct is made of sheet metal and comprises upper and lower sections 31 and 33 (FIG. 5) of substantially square cross section. The upper section 31 extends upwardly through a vertical opening 34 in the bed 16 and is formed with a truncated pyramidal upper end portion 35 having a central opening 36 which is coaxial with the tip 26 of the torch 25. The truncated portion 35 is accommodated within a fore-and-aft extending slot 37 (FIG. 2) in the table 17 and is located in proximity to the underside of the workpiece 11.

The upper end of the lower section 33 of the duct 30 is formed with an outwardly extending flange 38 (FIG. 5) which is bolted at 39 (FIG. 6) to a plate 40 fastened to the bed 16 and partially covering the opening 34 therethrough. As shown in FIG. 1, the lower section of the duct leads downwardly to a receptacle such as a bucket 43 for collecting the molten metal downwardly from the workpiece 11. The bucket 43 is attached releasably to the duct and is located behind a panel 47 which covers the front of the bed 16. By grabbing a handle 49 on the front of the bucket 43, the latter may be slid outwardly away from the lower duct section 33 and may be pulled outwardly through an opening 50 in the front panel 47 so as to permit the solidified molten metal to be dumped from the bucket.

To dispose of smoke and other fumes resulting from operation of the torch 25, a vacuum system or unit 55 (FIG. 1) is located in proximity to the duct 30 (the unit herein being shown behind the front panel 47) and communicates with the duct by means of a flexible hose 56 which is connected to the lower duct section 33 just above the bucket 43. The vacuum unit 55 which is used herein is a conventional dust collector such as that identified as a Torit Model 64. Such a dust collector comprises a power-driven blower (not shown) which is operable to create suction in the duct 30 and to draw air through the hose 56 and then through a series of cloth filter bags 60 (FIG. 1) in the unit 55 before discharging the air to atmosphere. The filter bags are fire-resistant and are effective to filter particles as small as one micron from fumes passing through the unit 55 and to take smoke out of such fumes.

With the foregoing arrangement, molten metal from the workpiece 11 is blown downwardly into the duct 30 by the torch 25 and falls into the bucket 43 for collection and periodic removal. During operation of the torch, a negative pressure is continuously created in the duct by the vacuum unit 55 and thus fumes are sucked into the duct through the opening 36 so as to help keep the work area free of fumes. Upon passing through the duct 30, the hose 56 and the vacuum unit 55, the fumes are cooled and are cleaned of smoke and entrained foreign particles as an incident to passing through the filter bags 60. Thus, the air discharged to atmosphere is clean, smoke-free and relatively cool.

When a thin workpiece 11 is being cut by the torch 25, that area of the workpiece beneath the torch tends to deform downwardly. In accordance with one aspect of the present invention, the upper end of the upper duct section 31 is uniquely constructed to engage and support the overlying portion of the workpiece and reduce deformation thereof while still allowing the workpiece to move freely across the upper end of the upper duct section.

Figure 6:
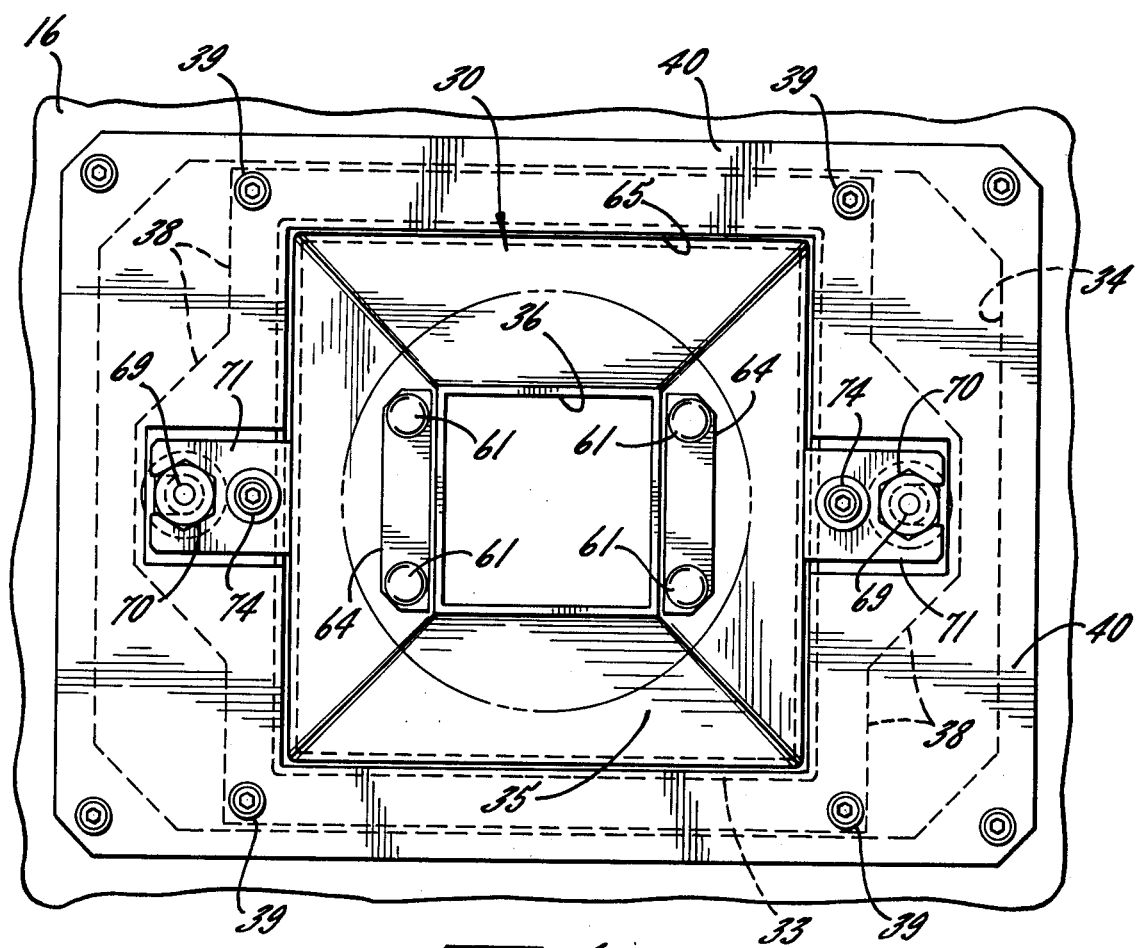
FIG. 6 is a fragmentary cross-section taken substantially along the line 6—6 of FIG. 5.

In carrying out the foregoing, upwardly extending projections 61 (FIG. 5) having an upwardly convex contour are spaced angularly around the upper end of the upper duct section 31 and engage the lower side of the workpiece 11. Herein, the projections 61 are formed by the substantially hemispherical heads of pins 63 which are attached to two flanges 64 secured to opposite sides of the upper duct section 31, there being two pins attached to the ends of each flange as shown in FIG. 6. The heads 61 of the pins engage the underside of the workpiece below the torch 25 to prevent deformation of the workpiece but, because of the rounded shape of the heads, substantially point contact is established between the heads and the workpiece so that the latter may glide freely across the heads even though the underside of the workpiece is of irregular contour as a result of a build up of dross. Such dross forms on the underside of the workpiece as a result of the plasma-arc operation and can acquire a thickness of approximately ten percent of the thickness of the workpiece. The rounded heads 61 allow free movement of the workpiece across the upper duct section 31 in spite of the dross.

Because of the heads 61, the opening 36 in the upper duct section 31 may be positioned closer to the underside of the workpiece 11 than has been possible heretofore. As a result, it is more difficult for fumes to escape between the workpiece and the upper end of the duct and thus the fume exhaust system 55 is rendered more effective.

According to the primary aspect of the invention, the upper duct section 31 is adapted to be shifted downwardly away from the workpiece 11 when the torch 25 is idle and the punch 14 is being used to form holes in the workpiece. Because the upper duct section 31 may be shifted downwardly, the work clamps 21 may be moved to a position immediately above the upper end of the upper duct section and the lower jaws 23 of the clamps will not hit or be obstructed by the upper duct section. Thus, the clamps may occupy a position which otherwise would be occupied by the upper duct section and may be moved to such position when necessary for proper location of the workpiece beneath the punch.

Figure 5:
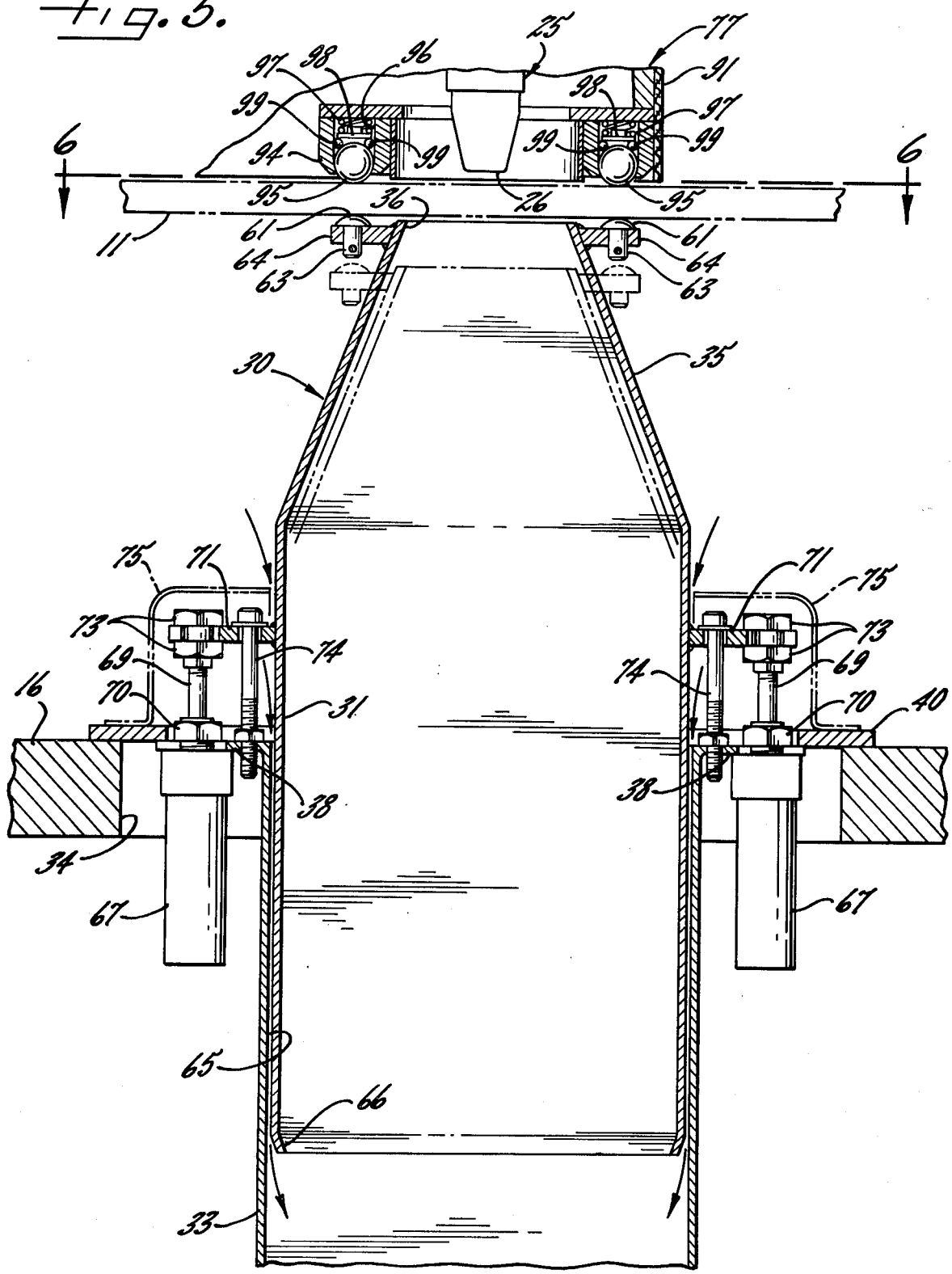
FIG. 5 is an enlarged view of parts shown in FIG. 3.

In the present instance, the upper duct section 31 is mounted to shift downwardly by virtue of the upper duct section being telescoped slidably into the lower duct section 33 as shown in FIG. 5. Preferably, the upper duct section is spaced inwardly a short distance from the lower duct section so as to leave a narrow passage 65 between the two sections, the passage providing clearance for accommodating expansion of the upper duct section when the latter gets hot. When the vacuum unit 55 is operating, air is sucked through the passage so as to cool the upper duct section and reduce the tendency of the upper duct section to expand into engagement with the lower duct section 31. The extreme lower end of the upper duct section 31 is turned inwardly as indicated at 66 in FIG. 5 so that the air flowing through the passage 65 will tend to direct dross and slag toward the center of the lower duct section 33 and thereby prevent such material from accumulating on the opposing slide surfaces of the two duct sections.

Up and down shifting of the upper duct section 31 is effected by a pair of power operated actuators which herein are in the form of air cylinders 67 (FIG. 5) having reciprocating rods 69. The two cylinders are located on opposite sides of the lower duct section 33 beneath the flange 38 and are secured to the flange by nuts 70. The rods 69 project upwardly through the cover plate 40 and are attached to outwardly projecting ears 71 (FIG. 6) on the upper duct section 31 by nuts 73. Each ear loosely receives a bolt 74 which is secured to the flange 38 and which serves as a stop to limit upward movement of the upper duct section 31. Sheet metal covers 75 enclose the rods 69, ears 71 and bolts 74 to prevent these elements from becoming fouled by dross and slag.

When air is admitted into the cylinders 67 to extend the rods 69, the upper duct section 31 is raised upwardly to shift the rounded heads 61 into engagement with the workpiece 11. When the rods are retracted, the upper duct section is lowered approximately three-fourths inches to provide sufficient clearance for the lower jaws 23 of the clamps 21 to move above the upper end of the upper duct section. Accordingly, lowering of the upper duct section moves the latter out of the horizontal plane occupied by the lower clamp jaws 23 and thus the upper duct section does not interfere with movement of the clamps when a punching operation is being performed on the workpiece.

The upper duct section 31 is lowered when the torch 25 is raised upwardly to an inactive position and then is raised when the torch is lowered downwardly to an active position adjacent the workpiece 11. To mount the torch for up and down shifting, the torch is attached to a bracket 76 (FIGS. 2 and 4) which, in turn, is connected to a shroud 77. The latter is carried on the lower end of a rod 79 (FIGS. 2 and 3) which is guided for up and down sliding in bushings 80, the latter being attached to vertically spaced brackets 81 which are welded to a plate 83 connected to the press frame 13. A housing 84 (FIG. 1) also is attached to the press frame and encloses the upper portion of the rod 79.

An air cylinder 85 (FIG. 2) is attached to the plate 83 and includes a rod 86 which is connected to a bracket 87 on the rod 79. When the air cylinder 85 is actuated to extend the rod 86, the rod 79 and the torch 25 are shifted upwardly until the torch is raised to the position shown in phantom in FIG. 5 and until the bracket 87 stops against the upper bushing 80 as shown in phantom in FIG. 3. In this way, the torch 25 may be retracted away from the workpiece 11 when a punching operation is being performed. The cylinder 85 and the cylinders 67 are actuated simultaneously but in opposite directions and thus the upper duct section 31 is retracted downwardly when the torch 25 is retracted upwardly. Conversely, the cylinders 67 raise the upper duct section 31 whenever the cylinder 85 is actuated to lower the torch 25 toward the workpiece.

Figure 4:
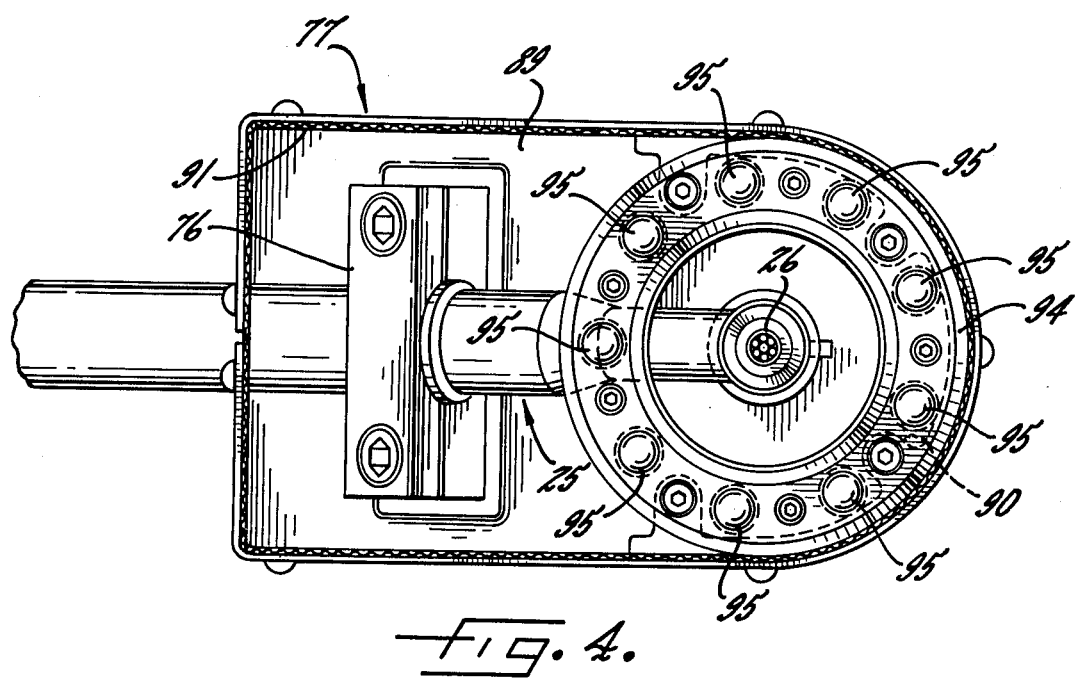
FIG. 4 is an enlarged fragmentary cross-section taken substantially along the line 4—4 of FIG. 3.

Further in accordance with the invention, fumes on the upper side of the workpiece 11 are sucked from the shroud 77 and are exhausted through the same vacuum unit 55 which serves the duct 30. As shown in FIGS. 3 and 4, the shroud 77 includes a horizontal top wall 89 and a depending wall 90, the latter extending around the front and the sides of the torch tip 26. A flexible curtain 91 made of fire-resistant material is connected to the top and front walls and substantially encloses the tip 26 so as to restrict the escape of fumes from the shroud. As shown in FIG. 3, the rod 79 is tubular and its lower end extends into the shroud 77 through the top wall 89 thereof. A flexible hose 93 is connected to the upper end of the rod 79 and leads to the vacuum unit 55 (see FIG. 1). As a result, the fumes in the shroud 77 are sucked through the rod 79 and pass through the filters 60 of the vacuum unit before being discharged into the atmosphere.

The shroud 77 is completed by a collar 94 (FIGS. 5 and 6) having a series of angularly spaced balls 95 which engage the workpiece 11 to establish the stand-off height of the torch 25. The collar 94 is secured to the lower end of the wall 90 and is formed with vertical holes 96 which receive the balls. The balls are pressed downwardly by coil springs 97 and discs 98 disposed in the holes 96 and, to reduce friction, small balls 99 are sandwiched between each disc and each large ball. The balls 95 accommodate irregularities in the upper surface of the workpiece 11 and allow the torch 25 to float vertically as the workpiece is shifted beneath the collar 94. Thus, the spacing between the workpiece and the tip 26 of the torch is maintained substantially constant regardless of the thickness of the workpiece and regardless of surface irregularities.

The shroud 77 not only collects fumes and establishes the stand-off height of the torch 25 but also reduces the noise produced by the torch from about 105 db. to about 85 db. In addition, the shroud shields the operator from the arc of the torch and thus reduces the need of eye protection for the operator.

We claim:

1. Apparatus for cutting a metal workpiece, said apparatus comprising a support, a metal melting tool mounted in a horizontally stationary position on said support and operable to emit downwardly directed energy for melting said workpiece, a horizontal work table located below said tool and supporting said workpiece for movement beneath said tool whereby parts of said workpiece may be melted by said tool, an upright duct extending upwardly through said table, an opening in the upper end of said duct and alined with said tool whereby molten metal is directed downwardly into said duct, at least a portion of said duct being mounted for movement between an active raised position in which the upper end of said duct is disposed closely adjacent the underside of said workpiece and an inactive lowered position in which the upper end of said duct is spaced below the underside of said workpiece.

2. Apparatus as defined in claim 1 in which said duct comprises an upper portion and a lower portion, said upper portion being telescoped slidably with said lower portion.

3. Apparatus as defined in claim 2 in which said upper portion is telescoped into said lower portion.

4. Apparatus as defined in claim 2 further including a power-operated actuator connected to said upper portion and operable to shift the latter between said raised and lowered positions.

5. Apparatus as defined in claim 1 further including means for shifting said tool between an active lowered position and an inactive raised position, the lower end of said tool being located closely adjacent the upper side of said workpiece when said tool is in said lowered position and being spaced above the upper side of said workpiece when said tool is in said inactive position, and means for shifting said one portion of said duct from its lowered position to its raised position in response to said tool being shifted from its raised position to its lowered position.

6. Apparatus as defined in claim 5 in which said last-mentioned means shift said one portion of said duct from its raised position to its lowered position in response to said tool being shifted from its lowered position to its raised position.

7. Apparatus as defined in claim 1 further including upwardly extending projections on the upper end of said duct and spaced angularly around said opening, said projections being of an upwardly convex shape and being located in engagement with the underside of said workpiece when said one portion of said duct is in said raised position.

8. A punch press comprising a frame and a vertically reciprocable punch, a die on said frame in underlying relation with said punch and adapted to coact with said punch to form a hole in an intervening workpiece when said punch is advanced downwardly, a table on said frame and underlying and supporting said workpiece, a clamp on said table and having upper and lower genrlly horizontally extending jaws positioned to grip the upper and lower sides of said workpiece along one edge thereof, said table being movable relative to said frame in a fore-and-aft direction, said clamp being movable in a fore-and-aft direction with said table and also being movable in a transverse direction relative to said table whereby different areas of said workpiece may be positioned beneath said punch by moving said table and said clamp, a metal cutting tool mounted in a horizontally stationary position on said frame in transversely spaced relation with said punch and operable to emit downwardly directed energy for melting said workpiece, an upright duct extending upwardly through said table and located in a horizontally stationary position, said duct having an upper portion and a lower portion, an opening in the upper end of the upper portion of said duct and alined with said tool whereby molten metal is directed downwardly into said duct, and means for moving the upper portion of said duct relative to said lower portion between an active raised position in which the upper end of said upper portion is disposed in engagement with the underside of said workpiece and an inactive lowered position in which the upper end of said upper portion is spaced below the underside of said workpiece, the upper end of said upper portion, when in said raised position, projecting into the horizontal plane occupied by the lower jaw of said clamp and being spaced below said plane when in said lowered position whereby said clamp may be moved to a location above the upper end of said duct.

9. Apparatus for cutting a metal workpiece, said apparatus comprising a support, a metal melting tool mounted in a horizontally stationary position on said support and operable to emit downwardly directed energy for melting said workpiece, a horizontal work table located below said tool and supporting said workpiece for movement beneath said tool whereby parts of said workpiece may be melted by said tool, an upright duct extending upwardly through said table and having an upper end positioned adjacent the underside of said workpiece, an opening in the upper end of said duct and alined with said tool whereby molten metal is directed downwardly into said duct, and upwardly extending projections on the upper end of said duct and spaced angularly around said opening, said projections being of an upwardly convex shape and being located in engagement with the underside of said workpiece.

10. Apparatus as defined in claim 9 in which said projections are substantially hemispherical.

11. Apparatus for cutting metal workpieces, said apparatus comprising a support, a torch mounted in a horizontally stationary position on said support and having a tip operable to produce a downwardly directed plasma-arc of high temperature and velocity, a horizontal work table located below said tip supporting said workpiece for movement beneath said tip whereby parts of said workpiece may be melted and blown downwardly by said plasma-arc, a shroud connected to said torch and at least partially surrounding said tip to collect fumes created above said workpiece, an upright duct extending upwardly through said table and having an upper end positioned adjacent the underside of said workpiece, an opening in the upper end of said duct and alined with said tip, a vacuum unit communicating with said shroud and also with said duct for sucking fumes from said shroud and said duct, and a filter associated with said vacuum unit for removing particles entrained in said fumes.

* * * * *